United States Patent
McClain et al.

(10) Patent No.: US 9,688,306 B2
(45) Date of Patent: Jun. 27, 2017

(54) ELECTRONIC PATH ENTERING FOR AUTONOMOUS OR SEMI-AUTONOMOUS TRAILER BACKING

(71) Applicants: Jeremy Jason McClain, Oxford, MI (US); Jill Anne Palazzolo, Rochester, MI (US)

(72) Inventors: Jeremy Jason McClain, Oxford, MI (US); Jill Anne Palazzolo, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 18 days.

(21) Appl. No.: 14/929,784

(22) Filed: Nov. 2, 2015

(65) Prior Publication Data

US 2016/0052545 A1 Feb. 25, 2016

Related U.S. Application Data

(60) Continuation of application No. 14/087,304, filed on Nov. 22, 2013, now Pat. No. 9,195,230, which is a
(Continued)

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |

(Continued)

(52) U.S. Cl.
CPC .......... *B62D 13/06* (2013.01); *B62D 15/0285* (2013.01); *G05D 1/0011* (2013.01)

(58) Field of Classification Search
CPC ... B62D 13/06; B62D 15/0285; G05D 1/0011
USPC .......................................................... 701/41
See application file for complete search history.

(56) References Cited

U.S. PATENT DOCUMENTS

2002/0198634 A1* 12/2002 Shimazaki ........... B62D 15/028
 701/1
2004/0260439 A1* 12/2004 Endo ........................ B60Q 1/48
 701/36

(Continued)

FOREIGN PATENT DOCUMENTS

| GB | 2398048 B | 3/2006 |
| JP | H11240461 A | 9/1999 |

OTHER PUBLICATIONS

JP Pat. Appl. No. 2014-519106 Office Action dated Feb. 8, 2016.

*Primary Examiner* — Calvin Cheung
*Assistant Examiner* — Paula L Schneider

(57) ABSTRACT

A method of controlling a backing system for a vehicle and trailer assembly comprises initiating a path input mode on an electronic input device associated with an electronic control unit in the vehicle. An intended backing path is input into the electronic control unit by defining the intended backing path with an input control mechanism for the electronic input device. The path input mode on the electronic input device is ended.

20 Claims, 4 Drawing Sheets

Related U.S. Application Data division of application No. 13/331,278, filed on Dec. 20, 2011, now abandoned.

(60) Provisional application No. 61/503,129, filed on Jun. 30, 2011.

(51) Int. Cl.
*B62D 13/06* (2006.01)
*B62D 15/02* (2006.01)

(56) References Cited

U.S. PATENT DOCUMENTS

| | | | |
|---|---|---|---|
| 2011/0131243 A1 | 6/2011 | Aben et al. | |
| 2012/0271515 A1* | 10/2012 | Rhode | B62D 1/22 |
| | | | 701/42 |

* cited by examiner

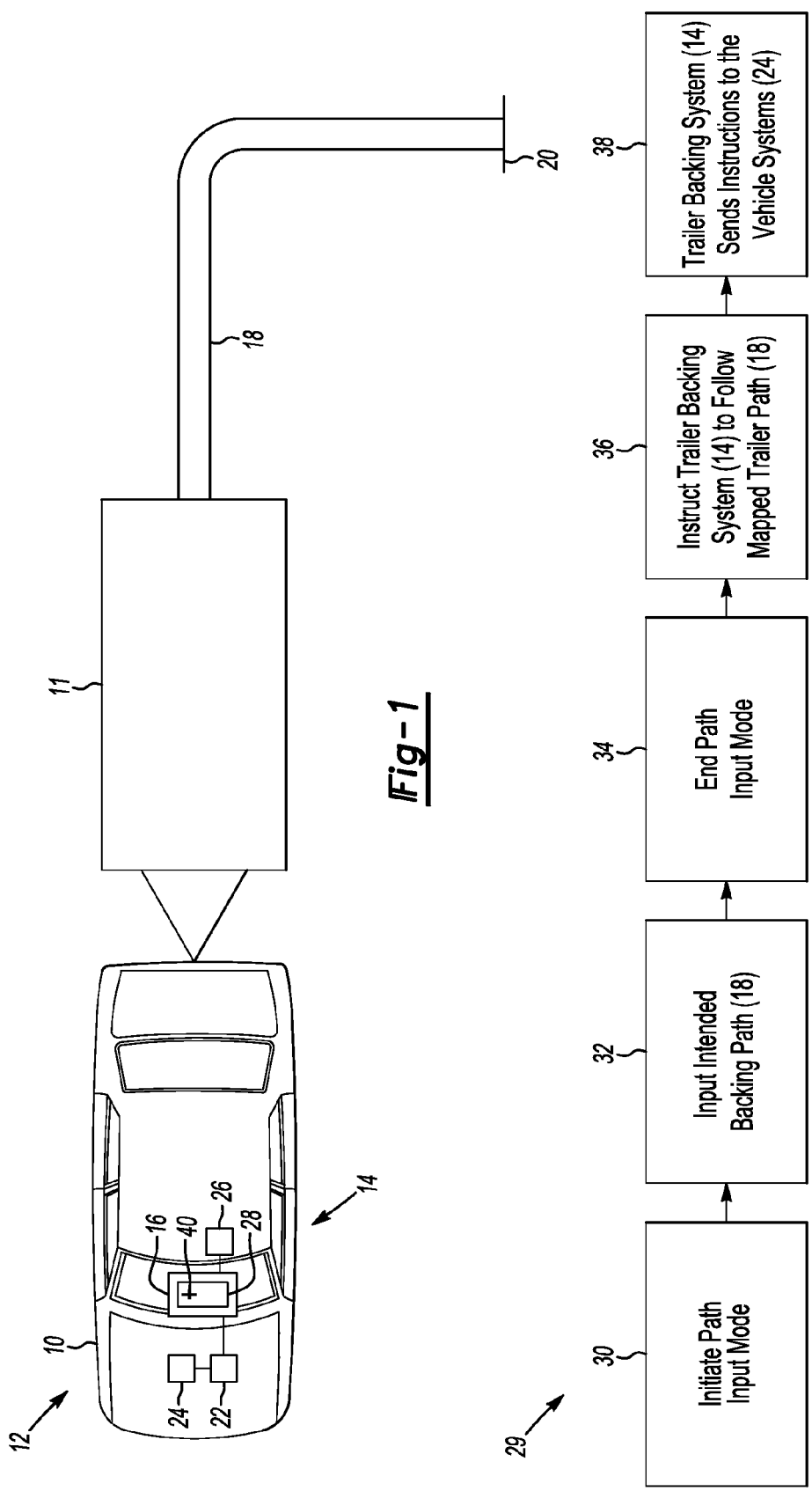

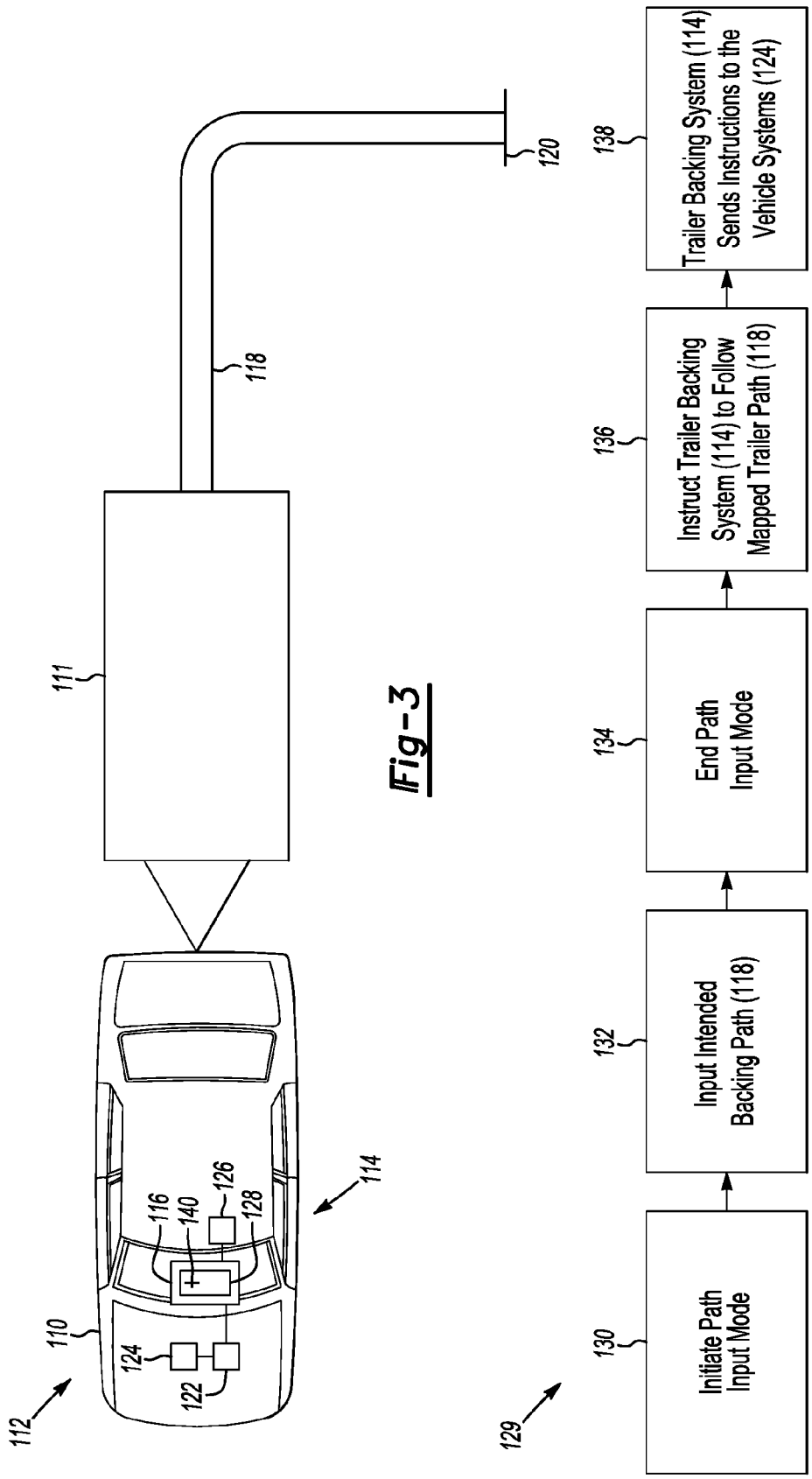

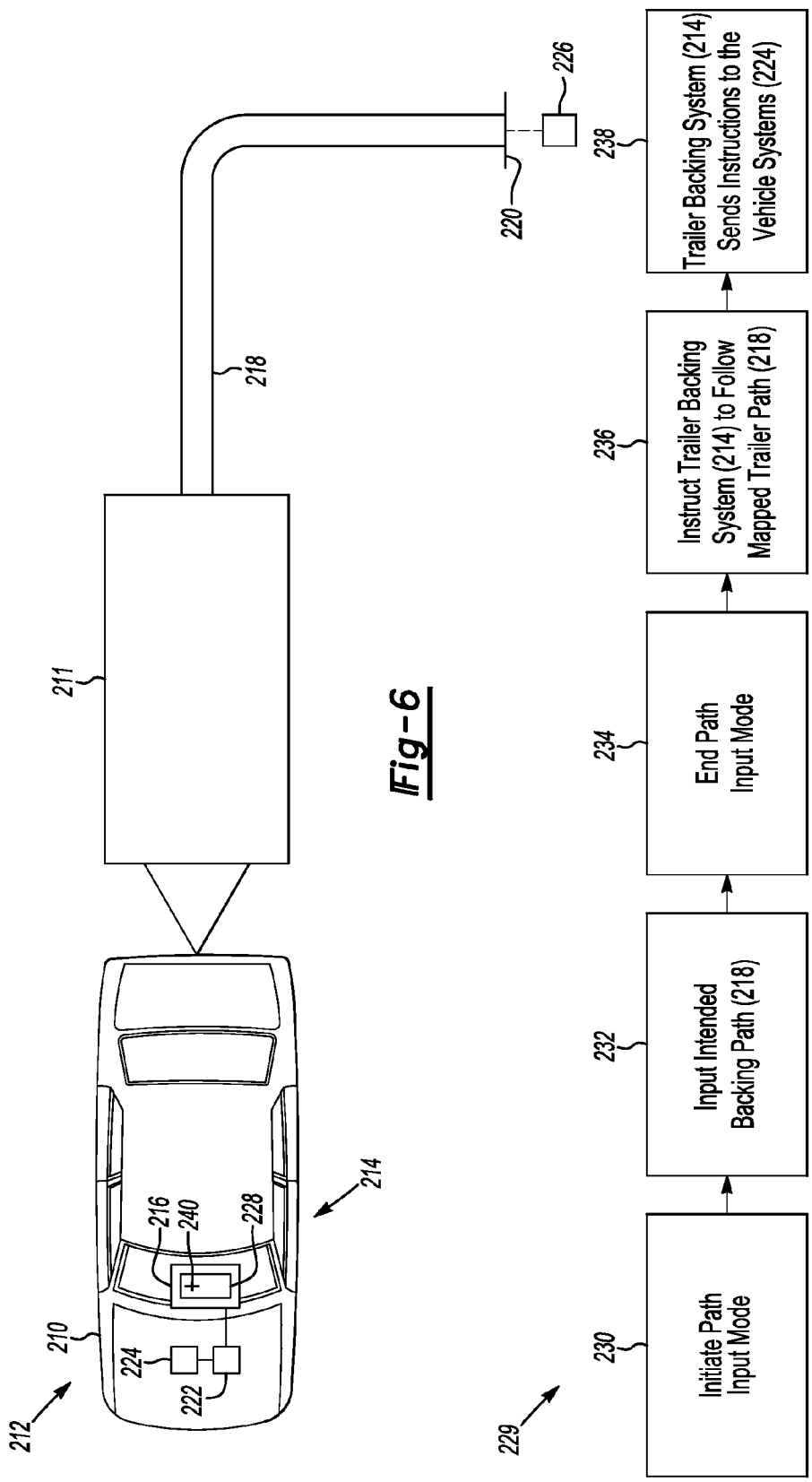

ously named inventors, to the extent it is described in this background section, as well as aspects of the description that may not otherwise qualify as prior art at the time of filing, are neither expressly nor impliedly admitted as prior art against the present disclosure.

ELECTRONIC PATH ENTERING FOR AUTONOMOUS OR SEMI-AUTONOMOUS TRAILER BACKING

TECHNICAL FIELD

The present disclosure relates to automotive vehicles and more particularly to advance driver assistance systems for automotive vehicles.

BACKGROUND

Backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer, particularly when backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a backing system for a vehicle and trailer assembly comprises initiating a path input mode on an electronic input device associated with an electronic control unit for a trailer backing system. An intended backing path is input into the electronic input device by defining the intended backing path with an input control mechanism for the electronic input device. The path input mode on the electronic input device is ended.

A method of controlling a backing system for a vehicle and trailer assembly comprises initiating a path input mode with a voice command to an electronic input device associated with an electronic control unit for a trailer backing system. An intended backing path is input into the electronic input device by voice command instructions. The path input mode on the electronic input device is ended with a voice command.

A method of controlling a backing system for a vehicle and trailer assembly comprises initiating a path input mode on an electronic input device associated with an electronic control unit for a trailer backing system. An intended backing path is input into a handheld electronic device by moving the handheld electronic device over the intended backing path. The intended backing path is input into the electronic input device from the handheld electronic device. The path input mode on the electronic input device is ended.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic diagram of a first embodiment of a vehicle and trailer assembly having a trailer backing system of the present invention;

FIG. 2 is a schematic illustration of a method of utilizing the trailer backing system of FIG. 1;

FIG. 3 is a schematic diagram of a second embodiment of a vehicle and trailer assembly having a trailer backing system of the present invention;

FIG. 5 is a schematic illustration of a method of utilizing the trailer backing system of FIG. 3;

FIG. 6 a schematic diagram of a third embodiment of a vehicle and trailer assembly having a trailer backing system of the present invention; and FIG. 7 is a schematic illustration of a method of utilizing the trailer backing system of FIG. 5.

DETAILED DESCRIPTION

Figure 4:
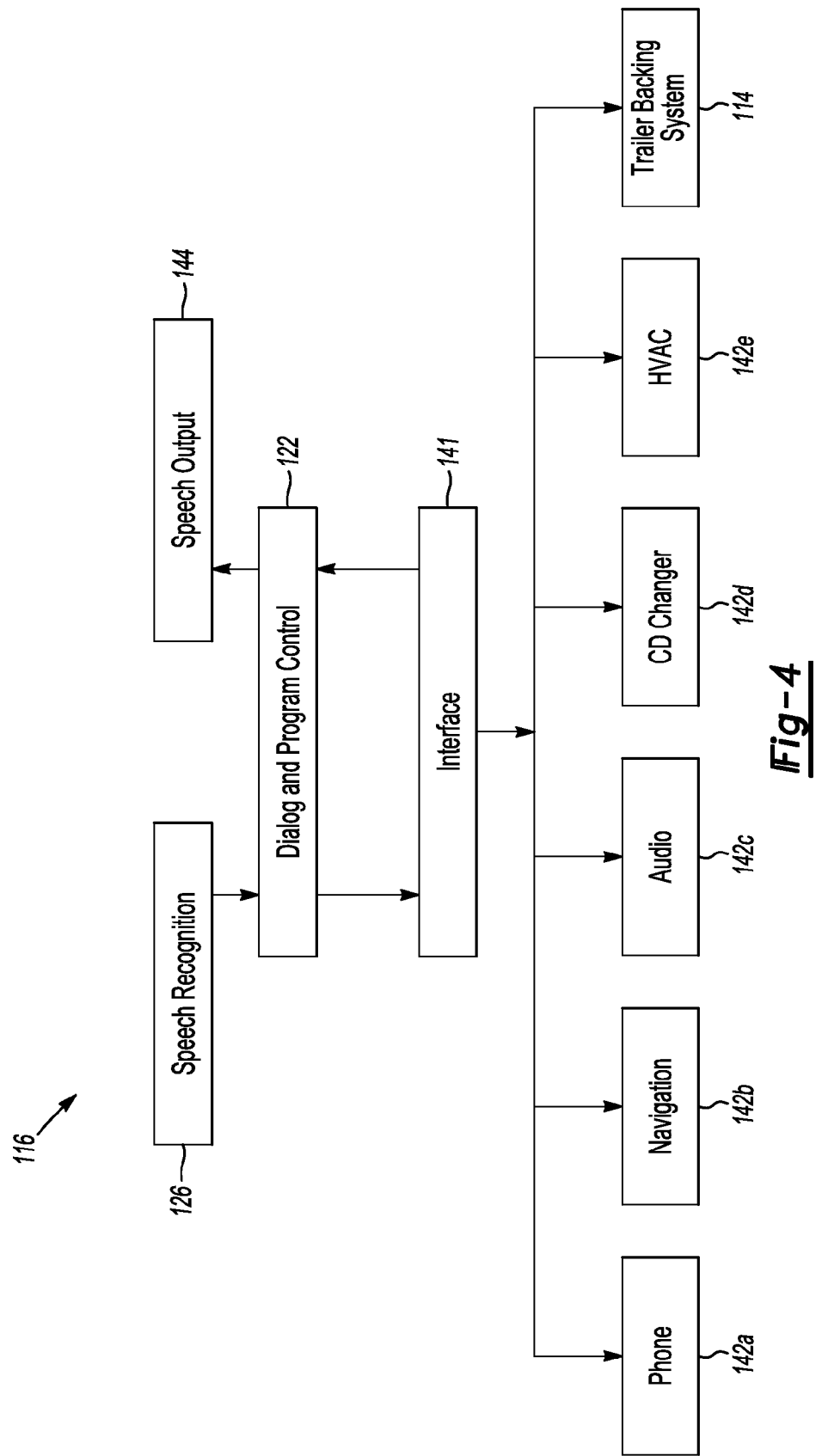
FIG. 4 is a schematic diagram of an input device for the second embodiment of the trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The trailer 11 is controllably secured to the vehicle 10 to form a vehicle and trailer assembly 12. The vehicle and trailer assembly 12 utilizes a trailer backing program 14 of the present invention. Throughout the application the relative directions of forward and rear are in reference to the direction which an operator for the vehicle 10 would be facing when operating the vehicle 10 in a drive gear. Therefore, in operation of the trailer backing program 14 the vehicle 10 would be in a reverse gear and the operator may be facing backward. The trailer backing program 14 provides the vehicle operator with a method of electronically defining an intended backing path 18 of the vehicle and trailer assembly 12. The trailer backing program 14 utilizes the intended backing path 18 to control movement of vehicle and trailer assembly 12.

Referring to FIG. 1, a first embodiment for utilizing the trailer backing program 14 is described. An electronic input device 16 is electronically connected to the vehicle 10 and the trailer backing program 14. The trailing backing program 14 includes a control unit 22 within the vehicle 10. The control unit 22 may be connected to at least one vehicle system 24 such as a powertrain system, a steering system and/or a brake system to control and direct movement of the vehicle and trailer assembly 12. The control unit 22 sends instructions to the vehicle systems 24 to move the vehicle and trailer assembly 12 along the intended backing path 18 to a final location 20. The steering, braking, and other controls are calculated by the control unit 22 based upon the intended backing path 18 input by the vehicle operator.

The electronic input device 16 includes an input control mechanism 26 and a display screen 28. The electronic input device 16 may be incorporated into the vehicle 10. For example, the electronic input device 16 may include a control panel and display screen 28 already within the vehicle 10, e.g. part of a navigation system or entertainment unit, or may be a separate device, such as a hand-held navigation system, that is electrically connected to the vehicle 10. The electronic input device 16 may also be partially incorporated into the vehicle 10 such as the display screen 28, but have a separate input control mechanism 26. The input control mechanism 26 may be a joystick, knob, slider device, physical buttons, virtual "touch screen" buttons, handheld electronic device such as a "smart phone" or voice control inputs. The electronic input device 16 may be connected through a wired connection, such as a USB connector, or may be wirelessly linked with the vehicle 10. The input control mechanism 26 may control an on-screen locator 40 on the display screen 28.

The display screen 28 may illustrate a schematic or image of an area located behind the vehicle and trailer assembly 12. The on-screen locator 40 may be initially positioned at an initial location, e.g. at a rear position of the vehicle and trailer assembly 12. The input control mechanism 26 can be used to define and/or control the vehicle and trailer assembly's intended backing path 18 by pressing physical buttons, "touch screen" buttons, or by detecting movement of the input control mechanism 26 and measurement of internal accelerometers and/or gyroscope. This could also be completed by using voice controls or a joystick type device to move the on-screen locator 40 on the display screen 28 to outline the intended backing path 18. Therefore, the input control mechanism 26 can be manipulated to move the on-screen locator 40 on the display screen 28 to outline the intended backing path 18. The trailer backing system 14 would determine from the input the actual distances and movements required to direct the vehicle and trailer assembly 12 to follow the intended backing path 18.

FIG. 2 illustrates a first embodiment of a method of using the trailer backing system 14, shown at 29. The path input mode for the trailer backing system 14 is initiated, step 30. A vehicle operator would use the input control mechanism 26 to input an intended backing path 18 for the vehicle and trailer assembly 12 into the electronic input device 16, step 32. The intended backing path 18 would include the suggested backing route and a final parking position 20. The input control mechanism 26 may be utilized to input the intended backing path 18 by successively inputting each leg of a suggested route. For example, the input control mechanism 26 may be a joystick or knob that is part of the vehicle navigation and entertainment unit. The input control mechanism 26, e.g. joystick, knob, etc, can be manipulated to move the on-screen locator 40 over each successive leg of the intended backing path 18. The intended backing path 18 would include the suggested backing route and a final parking position 20. The vehicle operator would indicate once the complete backing path is entered by ending the path input mode, step 34. Once the intended backing path 18 is entered into the trailer backing program 14 the vehicle operator would instruct the trailer backing system 14 to follow the intended backing path 18, step 36. The trailer backing system 14 would send instructions to the vehicle systems 24 to direct the vehicle and trailer assembly 12 along the intended backing path 18 to the final position 20, step 38.

Alternately, each leg of the intended backing path 18 may be entered and the trailer backing system 14 may move the vehicle and trailer assembly 12 to that location prior to entering the next leg of the intended backing path 18. This may be accomplished by repeating steps 30-38 for each leg of the backing path 18.

FIGS. 3-5 illustrate a second embodiment of a trailer backing system 114 for a vehicle 110 and trailer 111 which are connected together to form a vehicle and trailer assembly 112. The trailer backing program 114 provides the vehicle operator a method of defining the intended backing path 118 of the vehicle and trailer assembly 112. An electronic input device 116 is electronically connected to the vehicle 110 and the trailer backing program 114. The trailing backing program 114 includes a control unit 122 within the vehicle 110 connected to at least one vehicle system 124 such as a powertrain system, a steering system and/or a braking system to control and direct movement of the vehicle and trailer assembly 112.

The electronic input device 116 includes an input control mechanism 126 and may include a display screen 128. The electronic input device 116 may be incorporated into the vehicle 110. For example, the electronic input device 116 may include a control panel and display screen 128 already within the vehicle 110, e.g. part of a navigation system or entertainment unit, or may be a separate device. The electronic input device 116 may also be partially incorporated into the vehicle 110 such as the display screen 128, but have a separate input control mechanism 126. The input control mechanism 126 is preferably a voice control system, shown in FIG. 4. The input control mechanism 126 may control an on-screen locator 140 on the display screen 128.

FIG. 4 illustrates an embodiment of an input control mechanism 126 that is a voice control system. The voice control system 126 may be connected to or partially incorporated with other vehicle 110 devices for performing various vehicle 110 functions. The other devices 142a-e that may be electronically connected include, for example, a telephone 142a, a navigation system 142b, an audio system 142c, a CD changer, 144d, or an HVAC system 144e. The voice control system 126 includes an interface 141, the audio input 146 and an audio output 144 for the vehicle 110. The interface 141 converts the audio input 146 from the vehicle operator into an electrical signal that can be used by the trailer backing system 114 and/or other devices 142a-e. Additionally, the interface 141 converts the electrical signals from the trailer backing system 114 and other devices 142a-e to an audio output 144 for the vehicle operator.

Referring to FIGS. 3-5, a second embodiment of a method of using the trailer backing system 114 is shown at 129. A vehicle operator would use the voice controlled input control mechanism 126 to input an intended backing path 118 for the vehicle and trailer assembly 112. The path input mode for the trailer backing system 114 is initiated, step 130. From within the passenger compartment a vehicle operator would use the voice controlled input control mechanism 126 to input an intended backing bath 118 for the vehicle and trailer assembly 112, step 132. Simple directions and distances may be used for voice input of the intended path 118, e.g. "back 10 feet", "stop", "turn right 90 degrees", "final position". The "on-screen" locator 140 may move to illustrate the position of the vehicle and trailer assembly 112 while also following the voice instruction from the vehicle operator.

The vehicle and trailer assembly 112 would follow each instruction as spoken and recorded by the input device 142. After the instruction from the vehicle operator is complete the path input mode is ended, step 134. After each step is entered into the trailer backing program 114 the trailer backing system 114 follows the instructions along the intended backing path 118, step 136. The trailer backing system 114 would send instructions to the vehicle system 124 to direct the vehicle and trailer assembly 112 along the intended backing path 118, step 138. By repeating the steps 130-138 the vehicle and trailer assembly 112 may be moved to a desired final parking position 120.

FIGS. 6 and 7 illustrates a third embodiment of a trailer backing system 214 for a vehicle 210 and trailer 212 which are connected together to form a vehicle and trailer assembly 214. The trailer backing program 214 provides the vehicle operator a method of defining an intended backing path 218 of the vehicle and trailer assembly 212.

An electronic input device 216 is connected to the vehicle 210 and the trailer backing program 214. The trailing backing program 214 includes a control unit 222 within the vehicle 210 connected to at least one vehicle system 224 such as a powertrain system, a steering system and/or a braking system to control and direct movement of the vehicle and trailer assembly 212.

The electronic input device 216 includes an input control mechanism 226 and a display screen 228. The electronic input device 216 may be incorporated into the vehicle 210. The electronic input device 216 may be partially incorporated into the vehicle 210 such as the display screen 228, but has a separate input control mechanism 226. For example, the electronic input device 216 may include a control panel and display screen 228 already within the vehicle 210, e.g. part of a navigation system or entertainment unit. The input control mechanism 226 is a handheld electronic device and may alternatively include the display screen 228. The handheld electronic device 226 may be a smart phone, a PDA, a handheld GPS, a key-fob, etc.

The handheld electronic device 226 may control an on-screen locator 240 on the display screen 228. The handheld electronic device 226 may be connected through a wired connection, such as a USB connector, or may be wirelessly linked with the electronic input device 216.

A control unit 222 within the vehicle 210 may be connected to at least one vehicle system 224 such as a powertrain system, a steering system and/or a braking system to control and direct movement of the vehicle and trailer assembly 212. The trailer backing system 214 could be designed to work real-time in which the vehicle and trailer assembly 212 follows the handheld electronic device 226 while the operator is walking the path 218. Alternatively, the trailer backing system 214 could be designed to work only after the path 218 has been mapped completely; allowing the person to first return to the vehicle 210.

FIG. 7 illustrates a third embodiment of a method of utilizing the trailer backing system 214 of FIG. 6. A vehicle operator or passenger exits the vehicle 210 with the handheld electronic device 226 in hand. When arriving at the back of the trailer 212, the operator initiates the path input mode on the handheld electronic device 226, step 230 and proceeds to walk the intended backing path 218, step 232. When the operator arrives at the desired final parking position 220 for the back of the trailer, the path input mode is ended, step 234.

Once the intended backing path 218 is entered into the trailer backing program 214 the vehicle operator would instruct the trailer backing system 214 to follow the intended backing path 218, step 236. The trailer backing system 214 sends instructions to the vehicle system 224 to direct the vehicle and trailer assembly 212 along the intended backing path 218 to the final parking position 220, step 238. The trailer backing system 214 autonomously (driver not behind the wheel) or semi-autonomously (driver behind the wheel) controls the lateral and longitudinal motion of the vehicle and trailer assembly 212 to follow the path 218 which was mapped out by the handheld electronic device 226.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a backing system for a vehicle and trailer assembly comprising:
    initiating a path input mode with a first audible command to an electronic input device associated with a control unit of a backing system;
    inputting an intended backing path into the electronic input device via at least one second audible command;
    ending the path input mode with a third audible command to the electronic input device;
    calculating with the control unit at least one movement necessary for the vehicle and trailer assembly to follow the intended backing path; and
    instructing at least one vehicle system with the electronic control unit to perform the calculated at least one movement such that the vehicle and trailer assembly move along the intended backing path to a final trailer position.

2. The method of claim 1, wherein inputting the intended backing path comprises inputting the intended backing path in real time.

3. The method of claim 1, wherein the first audible command, the second audible command, and the third audible commands are each in the form of voice commands.

4. The method of claim 1, wherein the second audible command is in the form of a voice command including at least one of a direction and a distance.

5. The method of claim 1, wherein inputting the intended backing path further comprises controlling a locator on a display screen of the electronic input device with the second audible command to move the locator over the display screen thereby defining each leg of the intended backing path.

6. The method of claim 1, wherein inputting the intended backing path further comprises entering each leg of the intended backing path prior to inputting a successive leg of the intended backing path.

7. The method of claim 1, wherein the intended backing path includes a plurality of legs, and the step of instructing the at least one vehicle system with the electronic control unit to perform the calculated at least one movement comprises instructing the vehicle and trailer along each of the plurality of legs.

8. The method of claim 1, wherein the control unit is associated with an input control mechanism comprising a voice control system.

9. The method of claim 8, wherein the voice control system includes an interface, an audio input, and an audio output.

10. The method of claim 8, wherein the input control mechanism is separate from the electronic input device, and the electronic input device receives signals from the input control mechanism.

11. The method of claim 1, wherein the intended backing path includes a suggested backing route and a final position.

12. A method of controlling a backing system for a vehicle and trailer assembly comprising:
    receiving a first command that initiates a path input mode at an electronic input device associated with a control unit of a backing system;
    receiving at least one second command that provides an intended backing path at the electronic input device, wherein the at least one second command is a voice command;
    receiving a third command that ends the path input mode at the electronic input device;
    calculating with the control unit at least one movement necessary for the vehicle and trailer assembly to follow the intended backing path; and instructing at least one vehicle system with the electronic control unit to perform the calculated at least one movement such that the vehicle and trailer assembly move along the intended backing path to a final trailer position.

13. The method of claim 12, wherein the first command and the third command are voice commands.

14. The method of claim 12, wherein the at least one second command is received at an input control mechanism comprising a voice control system.

15. The method of claim 14, wherein the voice control system comprises an interface, an audio input, and an audio output.

16. The method of claim 14, wherein the input control mechanism is separate from the electronic input device.

17. The method of claim 12, wherein the at least one second command comprises at least one of a direction and a distance.

18. The method of claim 12, wherein the intended backing path comprises a plurality of legs.

19. The method of claim 18, wherein the each of the plurality of legs are input successively prior to ending the path input mode.

20. The method of claim 12, wherein the electronic input device includes a display screen, the method further comprising moving an on-screen locator on the display screen in response to receiving the at least one second command.

* * * * *